(12) United States Patent
Barnard et al.

(10) Patent No.: US 10,715,605 B2
(45) Date of Patent: Jul. 14, 2020

(54) SYSTEM AND METHOD FOR LIMITING ACTIVE SESSIONS

(71) Applicant: ServiceNow, Inc., Santa Clara, CA (US)

(72) Inventors: Bryan Mather Barnard, Chicago, IL (US); Subbaaraya Kumar Deverakonda Venkata, Milpitas, CA (US); Silas A. Smith, San Diego, CA (US); Sanjay Shrikanth Kittur, San Jose, CA (US)

(73) Assignee: ServiceNow, inc., Santa Clara, CA (US)

( * ) Notice: Subject to any disclaimer, the term of this patent is extended or adjusted under 35 U.S.C. 154(b) by 168 days.

(21) Appl. No.: 15/584,978

(22) Filed: May 2, 2017

(65) Prior Publication Data
US 2018/0324260 A1 Nov. 8, 2018

(51) Int. Cl.
H04L 29/08 (2006.01)
H04L 29/06 (2006.01)

(52) U.S. Cl.
CPC ............ *H04L 67/143* (2013.01); *H04L 67/14* (2013.01); *H04L 67/141* (2013.01); *H04L 63/102* (2013.01)

(58) Field of Classification Search
CPC ... H04L 67/143; H04L 67/306; H04L 67/141; H04L 67/24; H04L 67/1008
See application file for complete search history.

(56) References Cited

U.S. PATENT DOCUMENTS

| | | | | |
|---|---|---|---|---|
| 6,922,724 B1* | 7/2005 | Freeman | ................. | G06F 9/505 709/223 |
| 2001/0049717 A1* | 12/2001 | Freeman | ............... | G06F 9/5027 709/203 |
| 2005/0168323 A1* | 8/2005 | Lenoir | .................. | H04N 5/765 340/5.74 |
| 2006/0059235 A1* | 3/2006 | Peterson | ................ | G06Q 10/00 709/206 |
| 2006/0235974 A1* | 10/2006 | Ueda | ..................... | G06F 9/5083 709/226 |
| 2006/0248180 A1* | 11/2006 | Bernardi | ............... | H04L 63/104 709/223 |
| 2010/0228865 A1* | 9/2010 | Omshehe | .............. | G06F 21/105 709/227 |
| 2012/0297068 A1* | 11/2012 | Arrowood | ........... | H04L 67/1002 709/226 |
| 2015/0088978 A1* | 3/2015 | Motukuru | ............. | H04L 67/148 709/203 |
| 2015/0169827 A1* | 6/2015 | LaBorde | ................. | H04L 67/12 705/51 |
| 2015/0288765 A1* | 10/2015 | Skraparlis | ........... | H04L 12/4641 709/228 |
| 2017/0078352 A1* | 3/2017 | Tribolet | ............. | H04L 67/1097 |

* cited by examiner

Primary Examiner — Philip J Chea
Assistant Examiner — Wuji Chen
(74) Attorney, Agent, or Firm — Fletcher Yoder PC

(57) ABSTRACT

Systems, methods, and media for limiting concurrent sessions include determining whether concurrent sessions exist on one or more connected nodes when a new session is to be established using a set of valid credentials. When concurrent sessions are to be limited, excess concurrent sessions are terminated in response to the establishment of the new session.

18 Claims, 5 Drawing Sheets

SYSTEM AND METHOD FOR LIMITING ACTIVE SESSIONS

BACKGROUND

The present disclosure relates in general to systems, methods, and apparatuses for limiting active sessions in an instance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources (e.g., configuration items) hosted in distributed computing (e.g., cloud-computing) environments may be disparately located with each having its own functions, properties, and/or permissions. Such resources may include hardware resources (e.g. computing devices, switches, etc.) and software resources (e.g. database applications). The software resources may be instantiated in one or more instances.

These resources may be provided and provisioned by one or more different providers with different settings or values. However, multiple logins from various locations may result in at least one session remaining open (e.g., open in a browser) that may inadvertently provide access to the resources by someone other than an authorized user. Moreover, these resources may be allocated and/or locked from access by other sessions. Moreover, a single user may tie up resources from a first location (e.g., a first Internet browser) that prevents the user from using a second location to access the resources (e.g., a second Internet browser).

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in this electronics-driven world. As more and more functions are performed by services using some form of distributed computing, the complexity of IT network management can drastically increase. As these devices are separated geospatially, users/groups may access resources from numerous locations using separate sessions. Each of these sessions may allocate and/or lock up resources of the system. Thus, sessions may be managed by limiting a number of concurrent sessions possible for an account, for a user, for a group of users (e.g., roles of users), for a domain, or any combination thereof to reduce load on the resources. Once the limit of concurrent sessions is reached, additional sessions are closed. In other words, pre-existing sessions may be closed in an on-demand manner to ensure that a number of active sessions does not exceed the limit. For example, if the maximum number would have been surpassed by one session arising from an attempt to create a new interactive session, an oldest session may be closed to return the number of sessions under the limit. In some embodiments, only certain types (e.g., interactive) sessions may be limited. For example, the types of sessions that are limited are those that are interactive that potentially cause more burden on the resources or allow unauthorized changes when an old session is accidentally left open (e.g., in a browser) for an unauthorized user to access the resource management. Other types of sessions, such as a secure network communication (SNC) session, may be exempt from the limitations for various purposes (e.g., debugging).

Figure 1:
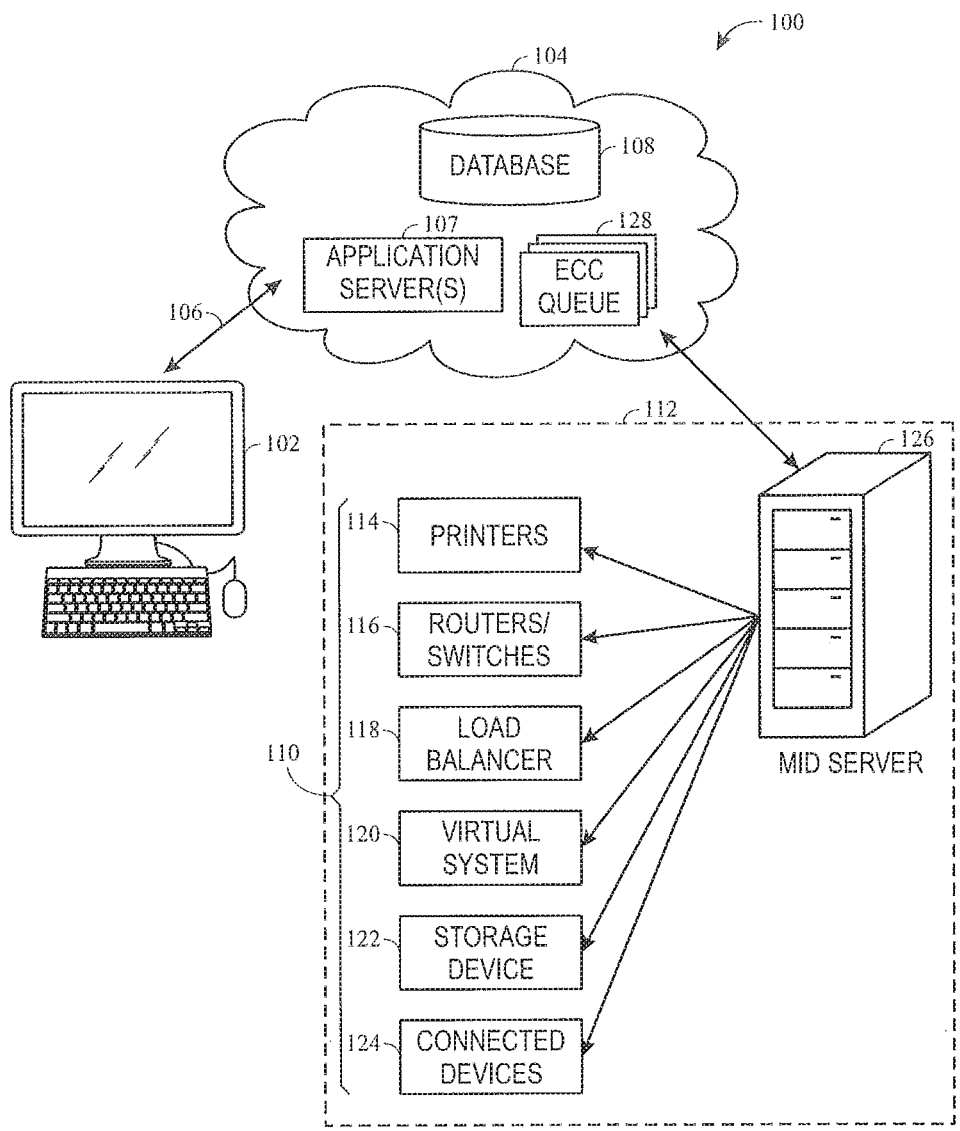
FIG. 1 is a block diagram of a distributed computing system utilizing a cloud service and one or more databases (CMDB), in accordance with an embodiment.

FIG. 1 is a block diagram of a system 100 that utilizes distributed computing. As illustrated a client 102 communicates with a platform 104 over a communication channel 106.

The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 (e.g., cloud service) may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database 108 via the platform 104. For example, the database 108 may include a configuration management database (CMDB), data (e.g., time-series) storage databases, relational databases, and/or any other suitable database types. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server 108.

The database 108 is a series of tables containing information about specific items. For example, in a CMDB, the tables include information about all of the assets and enterprise services controlled by a client 102 and the configurations of these assets and services. The assets and services include configuration items (CIs) 110 that may be computers, other devices on a network 112 (or group of networks), software contracts and/or licenses, or enterprise services that may be tracked by, used by, and/or accessed by one or more databases of database 108. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices, such as heating, ventilation, and air conditioning (HVAC) units, fuel tanks, power equipment, and/or the like.

As previously mentioned, additional to or in place of the CMDB, the database 108 may include one or more other database servers. The database servers are configured to store, manage, or otherwise provide data for delivering services to the client 102 over the communication channel 106. The database server includes one or more databases (e.g., CMDB) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

Access to the CIs 110 from the platform 104 is enabled via a management, instrumentation, and discovery (MID) server 126 via an External Communications Channel (ECC) Queue 128. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

The illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The ECC queue 128 may be a database table that is typically queried, updated, and inserted into by other systems. Each record in the ECC queue 128 is a message from an instance in the platform 104 to a system (e.g., MID server 126) external to the platform 104 that connects to the platform 104 or a specific instance running in the platform 104 or a message to the instance from the external system. The fields of an ECC queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message.

The platform 104 may allocate resources to users or groups of users in a multi-tenant and/or a single-tenant architecture. Allocating resources in a multi-tenant architecture includes include installations or instantiations of one or more servers, such as application servers, database servers, or any other server, or combination of servers, that can be shared amongst a group of users. For example, a web server, such as a unitary Apache installation; an application server, such as a unitary Java Virtual Machine; and a single database server catalog, such as a unitary MySQL catalog, may handle requests from multiple users. In a multi-tenant architecture, the application server, the database server, or both may distinguish between and segregate data or other information of the various customers using the system. In summary, multi-tenant architecture provides a single instance of software and all of the supporting infrastructure of the software serves multiple customers. In other words, each user shares the software application program and a database. The database and the software application program tracks who the data belongs to.

In a single-tenant architecture (which can also be referred to as a multi-instance architecture), separate web servers, application servers, database servers, or combinations thereof may be provisioned for at least some users or sub-users (e.g., sub-accounts) of those users. In the single-tenant architecture, one or more web servers are provided and dedicated to a user and/or sub-users of that user. Moreover, transactions are processed using one or more dedicated application servers, and data is stored in one or more database servers dedicated to the user or sub-users of that user. In summary, a single-tenant architecture includes a single instance serves only a single user (and its sub-users). Thus, each user has its own database and instance of the software application program. In other words, the database and the software application program are not shared between users (outside of a user's sub-users).

In use, a user's instance may include multiple web server instances, multiple application server instances, multiple database server instances, and/or any combination thereof. The server instances may be physically located on different physical servers and may share resources of the different physical servers with other server instances associated with other customer instances.

Figure 2:
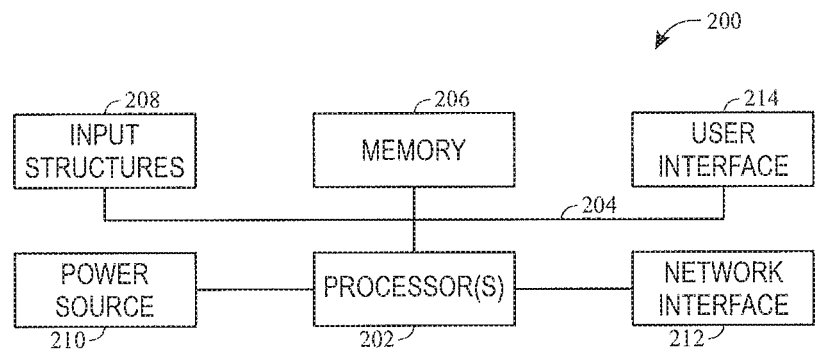
FIG. 2 is a block diagram of a computing device utilized in the distributed computing system of FIG. 1, in accordance with an embodiment.

FIG. 2 generally illustrates a block diagram of an embodiment of an internal configuration of a computing device 200. The computing device 200 may be an embodiment of the client 102, the application server 107, a database 108 (e.g., CMDB), other servers in the platform 104 (e.g., server hosting the ECC queue 128), device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other performing functions by executing instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

Figure 3:
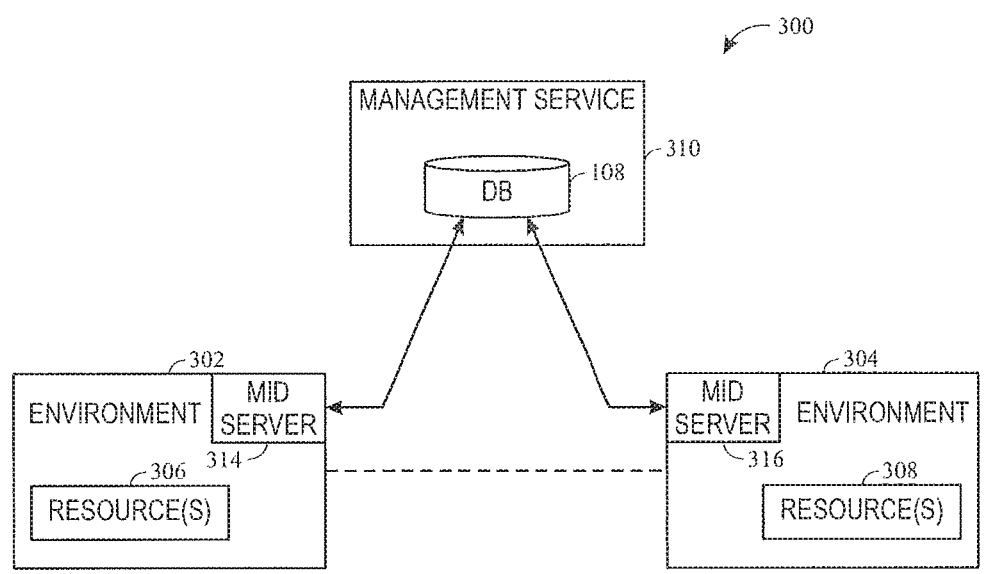
FIG. 3 is a block diagram of an electronic computing and communication system that utilizes the CMDB of FIG. 1, in accordance with an embodiment.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, FIG. 3 is a block diagram of an embodiment of an electronic computing and communication system 300 for managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account and/or role including resources that may be spatially distant from each other. In some embodiments, resources 306, 308 may of the environments 302, 304 may communicate with each other across environments. However, in some embodiments, aspects of various environments may be provided by different vendors without communication therebetween. In such embodiments, the resources of disparate environments may communicate using the platform 104 (e.g., a management service 310 including the platform 104). The resources 312 and 314 may be any suitable configuration item 110 previously discussed.

The management service 310 may include one or more servers providing access to and managing the database 108. The management service 310 may allocate or provision resources, such as application instances in the resources 306 or 308, from a respective environment 302 or 304. Further, the management service 310 may create, modify, or remove information in the database 108. For example, the management service 310 may manage a catalogue of resources in more than a single environment (even if the environments may not directly communicate with each other). Using this catalogue, the management service 310 may discover new resources, provision resources, allocate resources, modify, and/or remove resources from the catalogue across a single environment or multiple environments. In some embodiments, these actions may be initiated using the client 102, scheduled for periodic occasions, or a combination thereof. For example, a client 102 may receive a request, via its input structures, to query an identity of an application program interface (API) used by a resource to access a particular vendor/provider for the environment 302 that is passed to the management service 310 to query the database 108. As another example, the client 102 may receive a request, via its input structures, to query an identity of a user authorized to access a particular resource that is passed to the management service 310.

In the illustrated embodiment, each environment 302 and 304 has its own MID server 314 and 316. In some embodiments, a single MID server may be employed when the MID server may reach into multiple environments. For example, if the MID server is run in the platform 104 (e.g., in the management service 310), a single MID server may be used to manage both environments 302 and 304. Additionally or alternatively, if the MID server 314 has access to the environment 304, the MID server 316 may be omitted.

As previously noted, a number of sessions established for an account, for a user, and/or for a group of users may be limited. This provides those managing an account with an ability to set the maximum number of concurrent interactive sessions a user can have. The number (e.g., 1) may be set by an administrator and may vary from user to user and/or between roles of users.

When a user (or group of users) already has a maximum number of concurrent active sessions active. When a user logs in, the current sessions are identified. If the new session will result in the total number of sessions exceeding the maximum number, at least one session is closed. For example, for each excess session, an oldest sessions may be closed based on its creation date by sending out a cluster message across all nodes to set the locked_out attribute on the session(s) that is to be terminated. When the user tries to access the closed instance through a session that is locked_out, the client 102 will be redirected to the login page. In some embodiments, a single cluster message may correspond to multiple sessions to terminate. In other words, cluster messages may be bundled. For instance, cluster messages may be bundled to reduce likelihood of congestion of communications due to the cluster messages. In such embodiments, transmission of the cluster messages may be limited to a specific periodicity (e.g., once per minute) so that the transmitted cluster message bundles may identify all sessions to be closed that have been identified since the last cluster message was transmitted.

Figure 4:
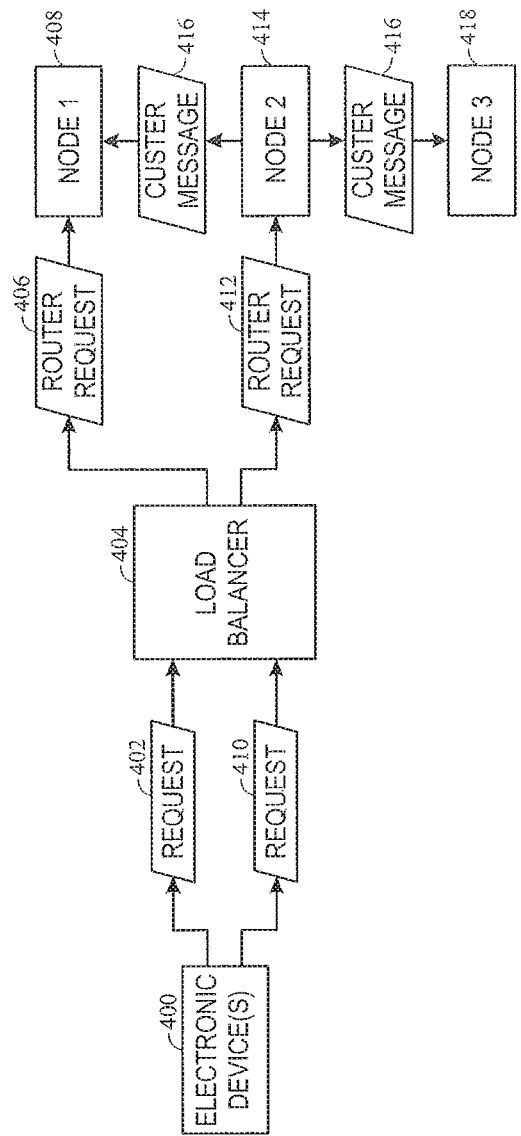
FIG. 4 is a block diagram illustrating limiting concurrent sessions, in accordance with an embodiment.

FIG. 4 illustrates a flow diagram that illustrates limiting concurrent sessions. Access to an instance is requested at an electronic device 400 using credentials (e.g., username and password). The electronic device 400 may include the client 102, such as a desktop computer, a laptop computer, a mobile device, a tablet, and/or any other suitable computing devices. The electronic device may utilize a program, such as an Internet browser, a dedicated application program, and/or other mechanisms to receive a request to access an instance. The request 402 is sent to a load balancer 402 of the platform 104.

The load balancer 404 routes the request as a routed request 406 to a first node 408. The first node 408 validates the credentials. Upon validation of the credentials, the first node 408 and creates a new valid session. For example, the first node 408 may create a new hypertext transfer protocol session pertaining to the credentials. An unauthenticated session may be created to connect to the first node 408 to pass the credentials initially. If such an unauthenticated session has been created, the unauthenticated session may be closed when the new valid session is created.

The first node 408 also checks whether other sessions of a specific type (e.g., interactive) are active on the instance. For example, active sessions may be stored a user sessions table in the database 108. If no active sessions are identified, the first node 408 may cease processing the request A second request 410 is received using the same credentials or using credentials that have been grouped into a group common with the credentials used for the first request 402. The second request 410 may be sent from a same electronic device 400 as the first request 402. For example, the first request 402 and the second request 400 may be sent using different applications of the same electronic device 400. For instance, the first request 402 may be from a first browser on the electronic device 400, and the second request may be from a second browser on the electronic device 400. Additionally or alternatively, the first request 402 and the second request 410 may be sent from different electronic devices 400. For example, the first browser may be a desktop or tablet browser while the second browser is a mobile browser.

The load balancer 404 then routes the second request 410 as a routed second request 412 to a second node 414. The second node 414 validates the credentials and creates a new valid session for the credentials closing an unauthenticated session similar to the first node 408 closing the unauthenticated session corresponding to the first request 402. The second node 414 then determines whether any other active sessions (e.g., interactive sessions) exist on the instance for the credentials or user group.

The second node 414 finds that a valid session exists, but the second node 414 may not know on which node the valid session exists. So, it invalidates the session record on the database 108. For example, a session identifier may be used to mark the session as locked. The second node 414 determines whether the current sessions to be closed are on the second node 414. If found on the second node 414, the second node 414 sets the locked_out attribute in the session object. If not found on the second node 414, the second node 414 sends out a cluster message to connected nodes 408 and 418. In the illustrated embodiment, the first node 408 finds that it has the first session on itself and sets the locked_out attribute on the session.

When the session that was originally accessed via the first request 402 is switched back to, the request 402 is reasserted. The load balancer 404 routes this request to the first node 408. The first node 408 determines that the locked_out attribute is set in the session. Thus, the first node 408 invalidates the session. Invalidating the session may include deleting the cookies, closing the session, and/or redirecting to a login page. Although the illustrated embodiment shows three nodes (e.g., application server nodes), some embodiments may include 1, 2, 3, 4, 5, 6, or more nodes.

Figure 5:
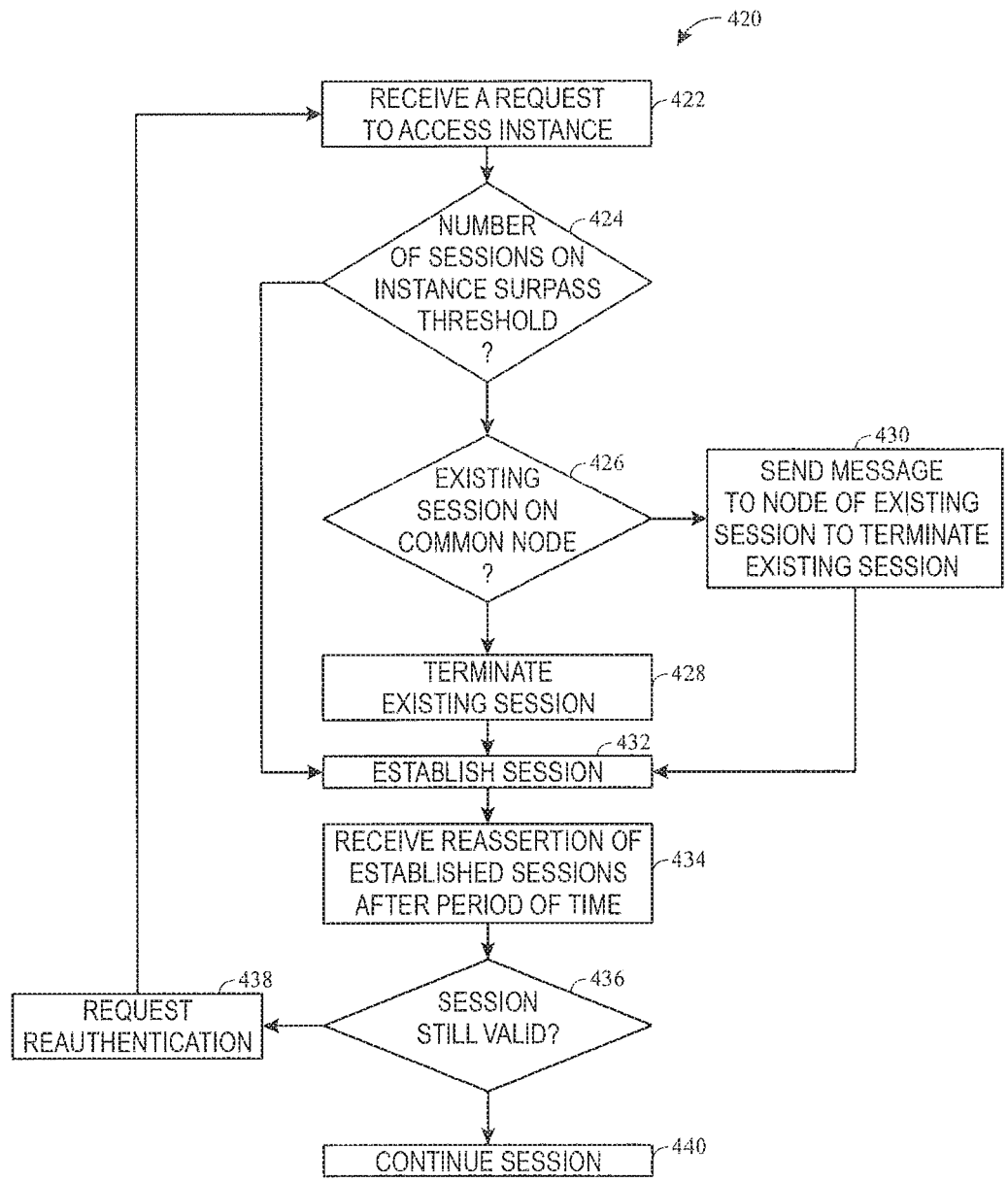
FIG. 5 is a block diagram illustrating a process for limiting concurrent sessions in FIG. 4, in accordance with an embodiment.

FIG. 5 illustrates a process 420 that may be performed by the platform 104. At least part of the functions may be embodied using hardware or software in the load balancer 404, the nodes 408, 414, or 418, application server 107, databases 108, and/or other connected devices. The platform 104 receives a request to access an instance (block 422). This request may be received from any connected device (e.g., the client 102) using a web browser, a dedication application program, and/or another suitable mechanism for sending a request to the platform 104. The request may include valid credentials (e.g., username and password). If the credentials are invalid, the platform 104 may not recognize the request as a valid request.

In response to a valid request, the platform 104 then determines whether the number of sessions that would result from granted access would surpass a threshold (block 424). For example, the platform 104 may determine whether a threshold limit is set based on a user, a group of users, roles of users, total number of users for the instance, and/or other limitations that may be placed on the instance.

When the number of sessions will surpass the threshold, the platform 104 determines (e.g., via the first node 408) whether an existing session to be terminated exists on a common node with the session to be established (block 426). When only a single node exists, the session to be established may be automatically considered as being on a common node with the existing session. When the session to be created and the session to be terminated are on a common node, the node may terminate the existing session directly (block 428). However, if the nodes are not common for the session to be established and the session to be terminated, the node where the session is to be established may send a message to the node where the session is to be terminated to terminate the session (block 430). Regardless of which node terminates the existing session, terminating the session may include indicating that the existing session is now locked out in the database 108 and returning the session to a login page.

Returning the session to the login page may occur when the now-terminated session is reasserted.

In addition to terminating the existing session, the session to be established is established (block 432). Establishing the session may include incrementing a number of active sessions in the database 108 (unless the established session is only replacing an existing session). In the illustrated embodiment, the message is sent before establishing the session. However, in some embodiments, this order may be reversed. Regardless of the order of the termination of the old session and establishment of the new session, in some embodiments, the sending of the message to close the existing session may only be generated and/or sent after the credentials are validated that are to be used in establishing the new session. In such embodiments, this order reduces likelihood of closing of the session by unauthorized users, such as a denial of service attack.

Either the established session or the terminated session may be reasserted (block 434). The node on which the session was established, determines whether the session is still valid (block 436). If the session has been terminated, the node requests reauthentication (block 438). For example, the client 102 may present a login page. If the session has not been terminated, the session may continue (block 440).

Figure 6:
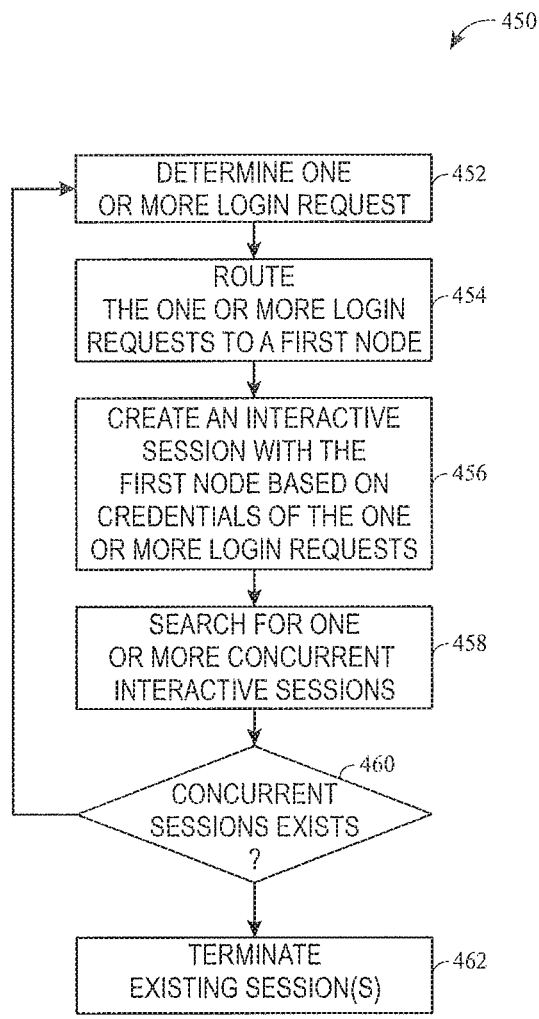
FIG. 6 is a block diagram illustrating a process for limiting concurrent sessions in response to determined login requests, in accordance with an embodiment.

FIG. 6 illustrates a process 450. The platform 104 determines that one or more login requests are made to access a client instance (block 452). For example, the platform 104 may receive the request from a client device. The platform 104 (e.g., load balanced 404) routes the one or more login requests to a first node (block 454). In some embodiments, some of the received one or more login requests may be routed to different nodes. The platform 104 also creates an interactive session with the first node based on credentials of the one or more login requests (block 456). In some embodiments, the login requests may result in more than a single session. For example, a login request having a certain origination type (e.g., a mobile application program) may result in one or more interactive sessions and one or more non-interactive viewing sessions. The interactive sessions enable changing data in databases and/or controlling CIs 110 while non-interactive viewing sessions allow auditing data without providing the ability to change the data viewed.

The platform 104 searches for one or more concurrent interactive sessions (block 458). For example, the platform 104 may examine data entries in the database 108 to determine whether interactive sessions are identified in the database 108. If one or more concurrent interactive sessions are identified (block 460), the platform 104 terminates one or more existing sessions (block 462). For example, the platform 104 may determine whether a number of interactive sessions found exceed a limit on number of concurrent sessions. As previously discussed, this limit may be set by an administrator for the client instance.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a non-transitory memory; and
one or more hardware processors configured to read instructions from the non-transitory memory to perform operations comprising:
receiving one or more login requests to access a client instance;
routing the one or more login requests to a first node of a plurality of nodes based at least on respective workloads distributed among the plurality of nodes;
creating a first session with the first node based at least in part on credentials of the one or more login requests, wherein the credentials are associated with an account having a group of users;
responsive to creating the first session, searching for one or more concurrent sessions each having one of a plurality of session types that use different credentials that are associated with the account with the client instance to terminate at least one of the one or more concurrent sessions;
determining whether a number of active sessions of the plurality of session types exceeds a threshold, wherein the number includes the first session and does not include sessions having certain session types;
determining whether the at least one of the one or more concurrent sessions is on the first node; and
based on the determination that the number of active sessions exceeds the threshold, terminating the at least one of the one or more concurrent sessions by sending a cluster message from the first node to the plurality of nodes to terminate the at least one of the one or more concurrent sessions when the at least one of the one or more concurrent sessions are not on the first node.

2. The system of claim 1, wherein the operations comprise:
routing at least one of the one or more login requests to a second node of the plurality of nodes based at least on respective workloads distributed among the plurality of nodes;
creating a second session with the second node based at least on additional credentials; and
responsive to creating the second session, searching for the one or more concurrent sessions with the client instance to terminate the one or more concurrent sessions.

3. The system of claim 2, wherein searching for the one or more concurrent sessions comprises searching a database for a number of concurrent sessions with the client instance.

4. The system of claim 1, wherein the operations comprise:
identifying a concurrent session from searching for the one or more concurrent sessions; and
determining that the concurrent session is associated with a second node of the plurality of nodes.

5. The system of claim 1, wherein sending the cluster message from the first node to the plurality of nodes comprises sending instructions to each of the plurality of nodes to lock out the first session.

6. The system of claim 4, wherein terminating the first session comprises sending a message from the first node to a second node instructing the second node to lock out the first session.

7. The system of claim 1, wherein the operations comprise receiving a selection of a limit of a number of the concurrent sessions active before terminating the first session.

8. A method, comprising:
receiving a first request to access an instance from a client device, wherein the first request includes first credentials associated with an account having a group of users;
routing the first request through a load balancer to a first node;
validating the first credentials;
at the first node, creating a first session based on the first credentials being validated;
receiving a second request to access the instance, wherein the second request to access includes second credentials, wherein the second credentials are associated with the account and are different than the first credentials;
routing the second request to a second node;
validating the second credentials;
at the second node, creating a second session based on the second credentials being validated, wherein the second credentials are associated with the account and are different than the first credentials;
determining that the first credentials and second credentials correspond to the account;
in response to the second request and to the first and second credentials corresponding to the account, determining whether a number of active sessions of a plurality of session types exceeds a threshold, wherein the number includes the first session and the second session and does not include sessions having certain session types; and
based on the determination that the number of active sessions exceeds the threshold, invalidating the first session, wherein invalidating the first session comprises the second node:
determining that the first session is not on the second node;
based at least in part on the determination that the first session is not on the second node, sending a cluster message to the first node; and
causing invalidation of the first session on the first node based at least in part on validation of the second credentials using the cluster message.

9. The method of claim 8, wherein the first and second sessions comprise respective first and second interactive sessions.

10. The method of claim 8, wherein the second request is received from the client device.

11. The method of claim 8, wherein the second request is received from another device.

12. The method of claim 8 comprising, in response to the number exceeding the threshold, locking out the first session.

13. The method of claim 12, wherein invalidating the first session comprises returning the client device to a login screen when an action is attempted in the first session.

14. The method of claim 8, wherein invalidating the first session comprises limiting transmission of the cluster message to a threshold periodicity, wherein the cluster message identifies all sessions to be terminated by any nodes connected to the second node.

15. The system of claim 1, wherein the certain session types comprises a secure network communication session type.

16. The system of claim 1, wherein interactive sessions are counted toward the number and non-interactive sessions are not counted toward the number.

17. The system of claim 1, wherein the operations comprise terminating the at least one of the one or more concurrent sessions on the first node, if the at least one of the one or more concurrent sessions are on the first node.

18. A non-transitory, tangible, and computer-readable medium storing instructions, that when executed, are configured to cause one or more processors to:
receive a first request to access an instance from a client device, wherein the first request includes first credentials associated with an account having a group of users;
route the first request through a load balancer to a first node;
validate the first credentials;
at the first node, create a first session based on the first credentials being validated;
receive a second request to access the instance, wherein the second request to access includes second credentials, wherein the second credentials are associated with the account and are different than the first credentials;
route the second request to a second node;
validate the second credentials;
at the second node, create a second session based on the second credentials being validated, wherein the second credentials are associated with the account and are different than the first credentials;
determine that the first credentials and second credentials correspond to the account;
in response to the second request and to the first and second credentials corresponding to the account, determine whether a number of active sessions of a plurality of session types exceeds a threshold, wherein the number includes the first session and the second session and does not include sessions having certain session types; and
based on the determination that the number of active sessions exceeds the threshold, invalidate the first session, wherein invalidating the first session comprises the second node:
determine that the first session is not on the second node;
based at least in part on the determination that the first session is not on the second node, send a cluster message to the first node; and
cause invalidation of the first session on the first node based at least in part on validation of the second credentials using the cluster message.

* * * * *